United States Patent [19]
Kaeriyama

[11] Patent Number: 5,117,322
[45] Date of Patent: May 26, 1992

[54] TAPE GUIDE MECHANISM FOR HELICAL SCAN RECORDING/REPRODUCTION APPARATUS

[75] Inventor: Takuya Kaeriyama, Kanagawa, Japan

[73] Assignee: Sony Corporation, Tokyo, Japan

[21] Appl. No.: 538,212

[22] Filed: Jun. 14, 1990

[30] Foreign Application Priority Data

Jun. 29, 1989 [JP] Japan .................. 1-168926

[51] Int. Cl.⁵ ............................................. G11B 15/60
[52] U.S. Cl. ............................................. 360/130.24
[58] Field of Search ..................... 360/130.23, 130.24

[56] References Cited

U.S. PATENT DOCUMENTS

| | | | |
|---|---|---|---|
| 3,661,311 | 5/1972 | Warren | 360/130.24 X |
| 3,995,318 | 11/1976 | Serizawa | 360/130.24 |
| 4,580,180 | 4/1986 | Murakoshi | 360/130.24 X |
| 4,837,646 | 6/1989 | Nagai | 360/130.23 X |

FOREIGN PATENT DOCUMENTS

| | | |
|---|---|---|
| 0211542A1 | 2/1987 | European Pat. Off. . |
| 3040016A1 | 5/1981 | Fed. Rep. of Germany . |
| 0115776A1 | 8/1984 | Fed. Rep. of Germany . |
| 1339936 | 9/1963 | France . |
| 0180489A1 | 5/1986 | France . |

*Primary Examiner*—A. J. Heinz
*Attorney, Agent, or Firm*—Philip M. Shaw, Jr.

[57] ABSTRACT

Helical scan recording/reproduction apparatus tape guides which include rotary inclined guides arranged on opposite sides of the head cylinder and leads are provided for regulating widthwise movement of the tape on the cylinder caused when the tape travels on the curved surface of the rotary inclined guides, so that the widthwise position of the tape upon tape travel can be automatically regulated, and the load to the tape drive motor caused by tape friction is reduced.

6 Claims, 2 Drawing Sheets

TAPE GUIDE MECHANISM FOR HELICAL SCAN RECORDING/REPRODUCTION APPARATUS

BACKGROUND OF THE INVENTION

1. Field of the Invention

The present invention relates to a helical scan recording/reproduction apparatus and more particularly to a tape guide mechanism used in the rotary head unit thereof and a tape travel mechanism around the rotary head.

2. Description of the Prior Art

A tape guide mechanism used in a rotary head unit and a tape travel mechanism around it of a conventional helical scan recording/reproduction apparatus will be described below with reference to FIG. 5.

FIG. 5 is a front view of a cylinder 1. The cylinder 1 has a propeller type rotary head 3 comprising a plurality of heads between upper and lower drums 8 and 9. The upper and lower drums 8, 9 are of the stationary type. The cylinder 1 is inclined at a predetermined acute angle to a predetermined direction. A lead 14 having an upper end face 14a for regulating the widthwise position of a tape 4 is provided on the curved surface of the lower drum 9 of the cylinder 1. Pin-like stationary inclined guides 11 and 12 are respectively provided on base portions 11a and 12a at a tape entrance and a tape exit of the cylinder 1. These stationary inclined guides 11 and 12 are inclined at a predetermined angle to a predetermined direction. Alternatively, these guides may have a conical shape.

A rotary upright guide 10 is provided so as to rotate around a shaft 10d in the upstream side (i.e. at the tape entrance side) of the stationary inclined guide 11, and a rotary upright guide 13 is provided so as to rotate around a shaft 13d in the downstream side (i.e. at the tape exit side) of the stationary inclined guide 12. Upper flanges 10a and 13a for regulating the widthwise position of the tape 4 are respectively provided on the upper portions of the rotary upright guides 10 and 13, and springs 10b and 13b for adjusting the heights of the upper flanges 10a and 10b with respect to an upper edge 4a of the tape 4 are respectively provided on the lower portions of the guides 10 and 13. The rotary upright guides 10 and 13 can be rotated as the tape 4 travels.

The tape 4 normally travels in the direction of the arrow a to be subjected to recording/reproduction. The tape 4 horizontally travels along the rotary upright guide 10, and the flange 10a slightly holds down the upper edge 4a of the tape 4 downward, thereby regulating the position of the tape 4 in one widthwise direction (the direction of the arrow c in FIG. 5). When the tape 4 passes the stationary inclined guide 11, it obliquely travels and contacts the cylinder 1, and is wound around the cylinder 1 at a predetermined winding angle. A lower edge 4b of the tape 4 is brought into contact with the upper end face 14a of the lead 14 of the cylinder 1, and the tape 4 travels along the upper end face 14a of the lead 14, thereby regulating the position of the tape 4 in the other widthwise direction (the direction of the arrow d in FIG. 5).

The tape 4 which has passed over the cylinder 1 passes the stationary inclined guide 12, and then travels horizontally again. The upper flange 13a slightly holds down the upper edge 4a of the tape 4, thereby regulating the same widthwise position of the tape 4 as described in the flange 10a.

As described above, in the conventional tape guide mechanism, the two edges 4a and 4b of the tape 4 are statically regulated by the upper flanges 10a and 13a, and the lead 14. Therefore, a so-called tape path alignment adjustment must be executed by adjusting the positions of the screw-like upper flanges 10a and 13a using a screwdriver or the like and absorbing a change in height by the springs 10b and 13b. Since the widthwise position of the tape 4 can be regulated by this adjustment, the inclination angle between the circumferential rotating direction of the rotary head 3 and the longitudinal direction of the tape 4 can be kept constant, and tape compatibility with different recording and reproduction apparatuses can be obtained. Regulation of the tape travel height requires precise operations executed while monitoring a reproduction signal using reference tapes, and the tape compatibility is often unobtainable, depending on the adjustment state.

In the tape path alignment adjustment, when contact forces of the upper flanges 10a and 13a of the rotary upright guides 10 and 13 to the upper edge 4a of the tape 4 are too strong, the tape 4 is deformed at the upper and lower edges 4a and 4b. However, when the contact forces are too weak, the lower edge 4b is undesirably separated from the upper end face 14a of the lead 14. Therefore, the tape path alignment adjustment for obtaining preferable contact between the upper flanges 10a and 13a and the edge 4a of the tape 4 requires delicate operations, and is cumbersome.

Since the cylinder is rendered compact (its diameter is decreased) according to the reduction in size of the helical scan recording/reproduction apparatus, the winding angle of the tape on the cylinder is increased, and the winding angle of the tape on the stationary inclined guide is also increased. Therefore, since the frictional resistance between the stationary inclined guides 11 and 12, and the tape 4 is thereby increased during tape travel, the load on the tape drive motor is increased. However, as the recording/reproduction apparatus is reduced in size, the motor must inevitably be rendered compact. As a result, a compact motor having a large torque is ironically required. In order to suppress an increase in the frictional resistance, the intervals between the cylinder 1 and the stationary inclined guides 11 and 12 may be increased. However, this arrangement disturbs the reduction in size of the recording/reproduction apparatus.

OBJECT AND SUMMARY OF THE INVENTION

It is an object of the present invention to provide a tape guide mechanism for a helical scan recording/reproduction apparatus, which can automatically regulate the widthwise position of a tape during tape travel without requiring adjustment.

It is another object of the present invention to provide a tape guide mechanism for a helical scan recording/reproduction apparatus, which can automatically regulate the widthwise position of a tape during tape travel while reducing the load to the tape driving means.

In order to achieve the above objects of the present invention, there is provided a tape guide mechanism comprising cylinder means having an outer curved surface over which a tape can travel, a tape entrance point toward which the cylinder is inclined at a predetermined angle with respect to a given plane, a tape exit point, and containing a rotary head for recording/reproducing a signal on/from a magnetic tape wound around the cylinder means. A pair of rotary, upright guide means, respectively are arranged at the entrance point and the exit point of the cylinder means, and extend perpendicular to the plane, for guiding the magnetic tape. A pair of inclined guide means, each arranged between the cylinder means and a different one of the pair of rotary upright guide means, and inclined at a predetermined angle with respect to the plane, also guide the magnetic tape. Each of the pair of the inclined guide means comprises a rotatable roller guide and a roller shaft for supporting the roller guide.

The cylinder means comprises lead means, provided on the curved surface of the cylinder means for regulating widthwise movement of the magnetic tape at an edge of the magnetic tape. The widthwise movement is caused by rotation of the roller guides when the magnetic tape travels along the inclined guide means in a direction parallel to the plane.

The rotary upright guide means and the rotary inclined guide means do not require the flanges at the top and bottom ends of the rotary guide means which are necessary in a conventional mechanism.

When the inclined guide means is provided so that widthwise movement of the tape upon rotation of the roller guide occurs in the direction toward the upper portion of the cylinder means, the lead means comprises an upper lead means, for regulating the widthwise movement at the upper edge of the magnetic tape.

It is preferable that the guide means is further provided on the curved surface of the cylinder means, or that a flange means is provided on the rotary inclined guide means so as to guide the edge of the magnetic tape when the magnetic tape travels in the reverse direction. When the lead means is provided on the upper portion of the cylinder means, the guide means is provided on the lower portion of the cylinder means, or the flange means is provided on the lower and of the rotary inclined guide means, for guiding the lower edge of the magnetic tape. The guide or flange means and the edge of the magnetic tape are brought into contact with each other only when the magnetic tape travels in the reverse direction.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

Figure 1:
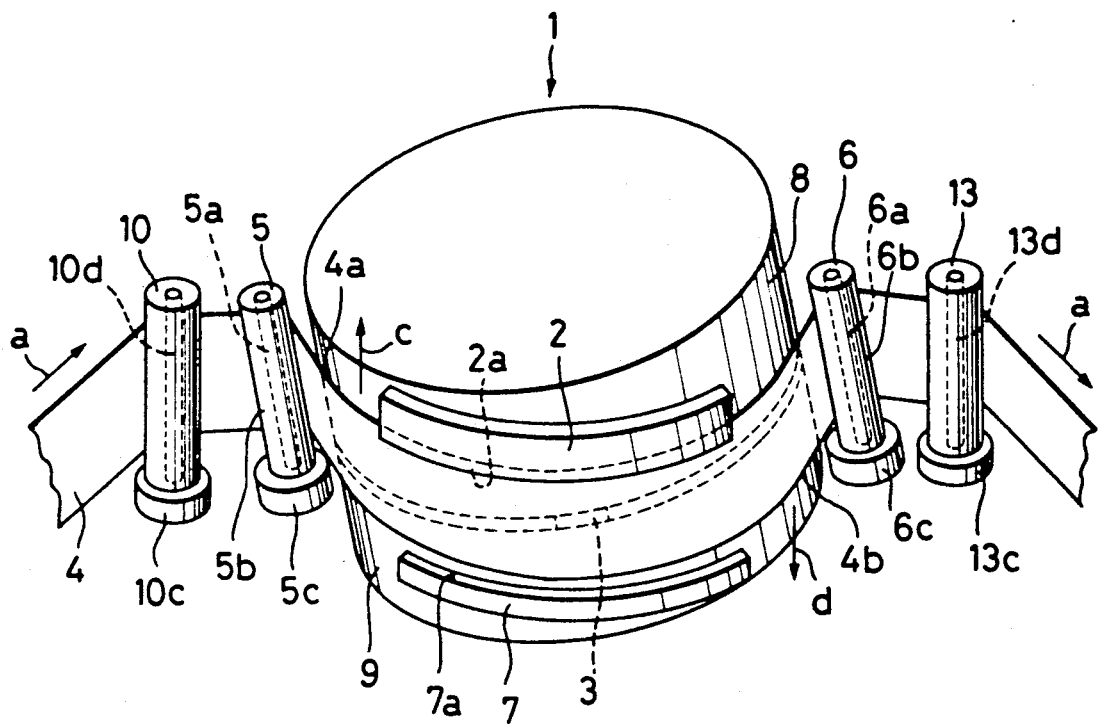
FIG. 1 is a frontal, perspective view of a tape guide mechanism arranged around a cylinder according to an embodiment of the present invention.

An embodiment of the present invention will be described below with reference to Figs. 1 to 4. The same reference numerals in this embodiment denote the same parts as in the prior art shown in FIG. 5, and a detailed description thereof will be omitted.

Figure 4:
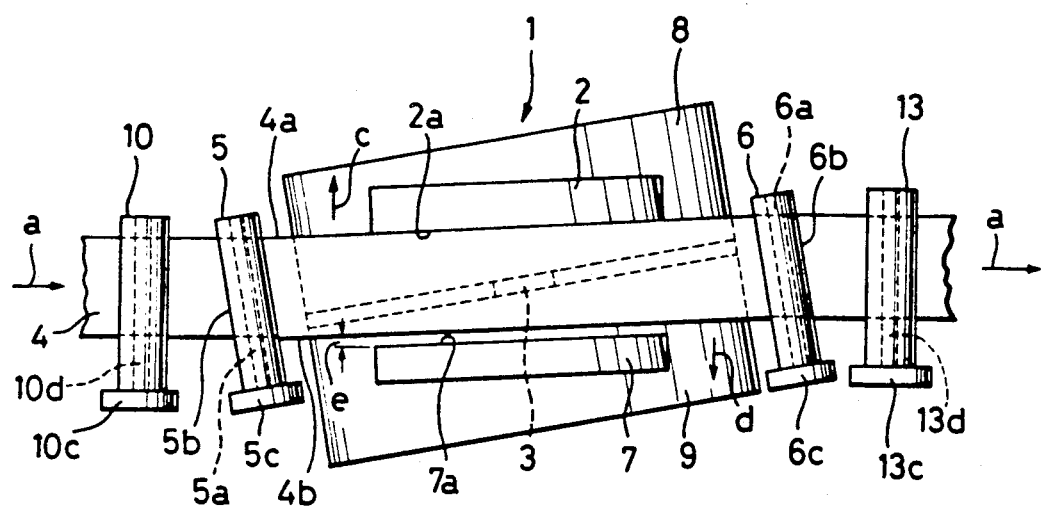
FIG. 4 is a front view of the tape guide mechanism shown in FIG. 1.

FIG. 1 is a perspective view of a tape guide mechanism of this embodiment, and FIG. 4 is a front view thereof. The cylinder 1 has a smaller diameter (e.g., 15 mm in diameter) than that of the prior art. A rectangular upper lead 2 is provided on the curved surface of an upper drum 8 of the cylinder 1 and is configured so that the angle defined between a lower end face 2a of the upper lead 2 and the circumferential direction of the cylinder 1 is kept constant.

A rectangular guide 7 is provided on the curved surface of a lower drum 9 of the cylinder 1 so that the angle defined between an upper end face 7a of the guide 7 and the circumferential direction of the cylinder 1 is equal to that of the angle between the lower end face 2a of the upper lead 2 and the circumferential direction of the cylinder 1.

The lower end face 2a is brought into contact with an upper edge 4a of the tape 4, thus regulating movement of the tape 4 in the widthwise direction (direction of the arrow c). During travel of the tape 4 in the direction of the arrow a, the guide 7 does not contact the tape 4 but keeps a clearance e (FIG. 4) of about 0.2 mm between a lower edge 4b of the tape 4 and the upper end face 7a of the guide 7. The guide 7 regulates the widthwise movement of the tape 4 moving by only the clearance e in the direction of the arrow d when the tape 4 travels in a reverse direction (direction of the arrow b in FIG. 3). The clearance e need only have a size large enough to allow for detection of, e.g., a start signal when the tape 4 travels in the reverse direction. Positional precision in the widthwise direction of the tape 4 for detecting this signal need not be so high.

In place of the guide 7 on the cylinder 1, collars 5c and 6c (serving as portions for stopping downward movement of a tape) at the bases of the rotary inclined guides 5 and 6 may be used.

The rotary inclined guides 5 and 6 are respectively arranged at a tape entrance point and a tape exit point with respect to contact with the cylinder 1. These rotary inclined guides 5 and 6 are arranged so that cylindrical guide portions 5b and 6b of the inclined guides 5 and 6, respectively, each having a curved surface are rotatable clockwise or counterclockwise around shafts 5a and 6a, respectively, when the tape 4 travels in the direction of the arrows a or b. The rotary inclined guides 5 and 6 are inclined at a predetermined acute angle in the same direction as the cylinder 1. The inclination direction, the inclination angle, and the horizontal distance to the cylinder 1 of the guides 5 and 6 can be determined by a known method if the inclination angle of the cylinder 1 is given.

Adjustment-free rotary upright guides 10 and 13 are outboard of the guides 5 and 6, respectively, and do not use flanges for regulating the position of the upper edge of the tape 4 or springs for adjusting the heights of the flanges at all. Base collar portions 10c and 13c of the rotary upright guides 10 and 13, respectively, serve to stop downward movement of the tape 4.

Figure 2:
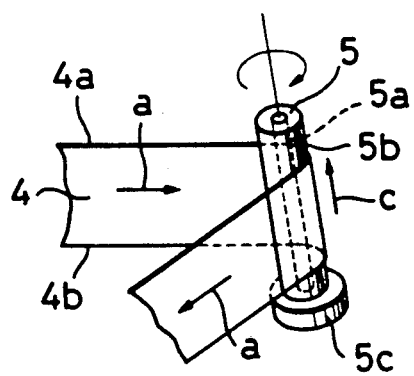
FIG. 2. is a frontal perspective view showing movement of the tape and movement of the rotary inclined guide during tape travel in the tape guide mechanism shown in FIG. 1.

When the tape 4 travels in the direction of the arrow a the tape guide mechanism with the above arrangement can regulate widthwise movement of the tape 4 as follows. FIG. 2 shows a portion of the rotary inclined guide 5. When the tape 4 travels in the direction of the arrow a, the tape 4 is wound around the rotary inclined guide 5 at a given winding angle and is turned back there, and travels along the curved surface of the cylindrical guide portion 5b. The cylindrical guide portion 5b is rotated clockwise around its shaft 5a. In this case, the tape 4 travels with a very low frictional resistance, and tends to move so as to be deviated in its widthwise direction indicated by the arrow c. Such a deviation force (azimuth effect) is generated at each of the rotary inclined guides 5 and 6, and the tape 4 tends to be moved in the widthwise direction indicated by the arrow c on the curved surface of the cylinder 1.

Since the upper lead 2 is in the path of the widthwise direction of movement of the tape 4 on the curved surface of the cylinder 1, the tape 4 is brought into light contact with the lower end face 2a of the upper lead 2, and travels along the lower end face 2a. The tape 4 which has passed over the cylinder 1 passes the rotary inclined guide 6, and travels with a same low frictional resistance as in the case of the rotary inclined guide 5 and returns to a horizontal travel state. In this manner, the widthwise portion of the tape 4 which travels in the direction of the arrow a on the cylinder 1 can be automatically regulated, and the frictional resistance between the tape 4 and the rotary inclined guides 5 and 6 can be decreased.

Figure 3:
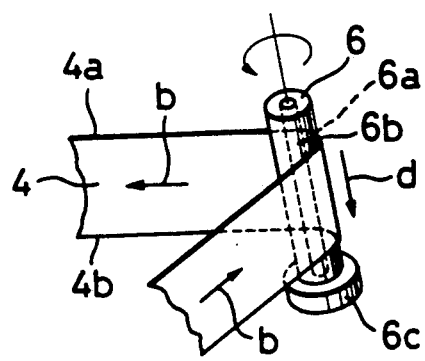
FIG. 3 is a frontal perspective view showing movement of the tape and movement of the rotary inclined guide when the tape travels in a direction opposite to the case of FIG. 2.

When the tape 4 travels in the reverse direction, as indicated by the arrow b, the widthwise movement of the tape 4 can be regulated as follows. FIG. 3 shows a portion of the rotary inclined guide 6. When the tape 4 travels in the direction of the arrow b along the curved surface of the guide portion 6b, the rotary inclined guide 6 is rotated counterclockwise around its shaft 6a. The tape 4 tends to move so as to be deviated in the downward widthwise direction indicated by the arrow d along the shaft 6a of the rotary inclined guide 6. On the inclined guide 5, the tape 4 is similarly moved in the direction of the arrow d. Therefore, the tape 4 is actually moved in the widthwise direction of the arrow d on the curved surface of the cylinder 1 through the clearance distance e, and then lightly contacts the upper end face 7a of the guide 7. Thus, the tape 4 travels along the upper end face 7a. In this manner, the tape 4 which travels along the cylinder 1 in the direction of the arrow b can be held so as to be prevented from being disengaged from the cylinder 1. In the same manner as described in a travel state in the direction of the arrow a, the frictional resistance between the tape 4, and the rotary inclined guides 5 and 6 is decreased.

A start signal must often be detected during travel of the tape 4 in the reverse direction. However, movement of the tape 4 in the direction of the arrow d by the clearance e does not adversely affect detection of such a signal.

As described above, the tape guide mechanism of this embodiment can automatically regulate the widthwise shifting of the tape 4 on the cylinder 1 by utilizing the deviation forces of the tape 4 itself generated by the rotary inclined guides 5 and 6 when the tape 4 travels in the direction of the arrow a or b. Thus, dynamic regulation can be attained as compared to static regulation of the prior art.

Figure 5:
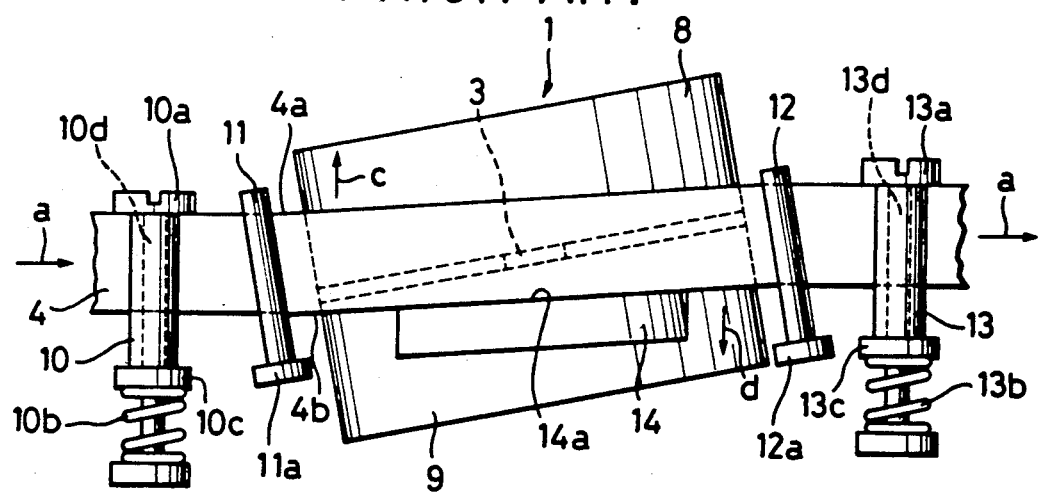
FIG. 5 is a front view of a conventional tape guide mechanism.

Therefore, since tape path alignment adjustment required in the prior art can be omitted, the upper flanges 10a and 13a and the springs 10b and 13b shown in FIG. 5 which are necessary in the prior art can be omitted from the rotary upright guides 10 and 13 when the tape 4 is considerably shifted in the direction of the arrow c. In this case, the upper edge 4a of the tape 4 is not in contact with the upper flanges 10a and 13a during normal tape travel. Since the upper or lower edge 4a or 4b of the travelling tape 4 is merely in light contact with the lower end face 2a of the upper lead 2 or the upper end face 7a of the guide 7, the tape 4 will not be damaged at its upper and lower edge 4a and 4b, respectively.

When the diameter of the cylinder 1 is decreased as compared to a convention tape recorder/reproducer apparatus, the frictional resistance between the stationary, inclined guides 11 and 12 and the tape 4 is increased in the conventional tape guide mechanism, described with reference to FIG. 5. However, in this embodiment, the frictional resistance is decreased since the rotary inclined guides 5 and 6 are employed. Therefore, the load to the tape drive motor (not shown) can be reduced and the motor can be easily rendered compact. The intervals between the cylinder 1 and the stationary inclined guides 11 and 12 need not be increased to decrease the wrapping angle of the tape with respect to the guides and to decrease the frictional resistance. The cylinder 1 and the guides 5 and 6 can be arranged close to each other.

As described above, according to the tape guide mechanism of this embodiment, the widthwise portion (travel height) of the tape can be regulated without requiring adjustment, and tape compatibility (recordability/reproducibility among different recording/reproduction apparatuses) can be easily realized.

In this embodiment, the cylinder employs a propeller head with stationary upper and lower drums. However, the present invention may, for example, be applied to an upper or lower drum rotary type. In this case, the lead 2 can be arranged on the stationary drum side.

What is claimed is:

1. A tape guide mechanism comprising:
   (a) cylinder means having an outer curved surface over which a tape can travel, a tape entrance point toward which the cylinder is inclined at a first predetermined acute angle with respect to a given plane, a tape exit point, and containing a rotary head for recording/reproducing a signal on/from a magnetic tape wound around the cylinder means;
   (b) a pair of rotary, upright guide means, respectively arranged at the entrance point and the exit point of the cylinder means, for guiding the magnetic tape;
   (c) a pair of rotary inclined guide means, each arranged between the cylinder means and a different one of the pair of rotary upright guide means, and inclined at a second predetermined acute angle with respect to the plane, for guiding the magnetic tape, each of the pair of rotary inclined guide means comprising a rotatable roller guide and a roller shaft for supporting the roller guide; and
   (d) wherein the cylinder means comprises lead means, provided on the curved surface of the cylinder means, for regulating widthwise movement of the magnetic tape at each edge of the magnetic tape, the widthwise movement being caused by rotation of the roller guides when the magnetic tape travels along the rotary inclined guide means in a direction parallel to the plane.

2. A tape guide mechanism according to claim 1, wherein the cylinder means further comprises guide means, provided on the curved surface of the cylinder means, for guiding an edge of the magnetic tape only when the magnetic tape travels in a reverse direction from the exit point toward the entrance point.

3. A tape guide mechanism according to claim 1, wherein each of the roller guides has a bottom end and comprises flange means provided on the bottom end, for guiding an edge of the magnetic tape only when the magnetic tape travel in a reverse direction from the exit point toward the entrance point.

4. A tape guide mechanism according to claim 1, wherein rotation of the roller guides when the magnetic tape is traveling in the direction from the entrance point toward the exit point causes widthwise movement of the tape in the direction toward the upper portion of the cylinder means, and the lead means comprises upper lead means, provided on an upper portion of the cylinder means, for regulating the widthwise position of the upper edge of the magnetic tape.

5. A tape guide mechanism according to claim 4, wherein the cylinder means further comprises guide means, provided on a lower portion of the cylinder means, for guiding a lower edge of the magnetic tape only when the magnetic tape travels in a reverse direction from the exit point toward the entrance point.

6. A tape guide mechanism according to claim 4, wherein each of the roller guides has a bottom end and comprises flange means provided on the bottom end, for guiding an edge of the magnetic tape only when the magnetic tape travels in a reverse direction from the exit point toward the entrance point.

* * * * *